(12) United States Patent
Santos Gomez et al.

(10) Patent No.: US 7,677,290 B2
(45) Date of Patent: Mar. 16, 2010

(54) CLEANING DEVICE FOR A PREIMPREGNATED CARBON FIBER PLACEMENT MACHINE

(75) Inventors: José Manuel Santos Gomez, Madrid (ES); Pablo Lopez Fernandez, Madrid (ES)

(73) Assignee: Airbus Espana, S.L., Madrid (ES)

( * ) Notice: Subject to any disclaimer, the term of this patent is extended or adjusted under 35 U.S.C. 154(b) by 803 days.

(21) Appl. No.: 11/516,032

(22) Filed: Sep. 5, 2006

(65) Prior Publication Data

US 2007/0272360 A1    Nov. 29, 2007

(30) Foreign Application Priority Data

May 25, 2006    (WO) ................ PCT/ES2006/070070

(51) Int. Cl.
*B32B 37/00* (2006.01)

(52) U.S. Cl. .............. 156/538; 156/441; 156/281; 156/433; 156/425; 8/137; 95/276; 34/82; 100/130; 427/350; 427/369; 118/264; 401/261; 15/256.6; 15/220.4; 15/88; 15/244.4; 15/246.2

(58) Field of Classification Search ............... 8/137; 156/441, 281, 433, 425; 95/276; 34/82; 100/130; 427/350, 369; 118/264; 401/261; 15/246.2

See application file for complete search history.

(56) References Cited

U.S. PATENT DOCUMENTS

| | | | | |
|---|---|---|---|---|
| 5,281,272 | A | * | 1/1994 | Moore ................. 118/108 |
| 5,827,338 | A | * | 10/1998 | Horvat ................. 55/285 |
| 7,454,813 | B2 | * | 11/2008 | Kaltenegger ........... 15/244.1 |
| 2006/0048793 | A1 | * | 3/2006 | Chiappetta ............. 134/6 |

* cited by examiner

*Primary Examiner*—Kat Wyrozebski
*Assistant Examiner*—Joshel Rivera
(74) *Attorney, Agent, or Firm*—Ladas and Parry LLP

(57) ABSTRACT

The present invention relates to a cleaning device (5) to be used in a preimpregnated carbon fiber placement machine including at least one guiding roller (47) for guiding a band (21) of tows to an application head (25), comprising two filtering elements (11, 13) arranged such that a band (21) of tows supported by two plates (15, 17) joined with adjustable clamping means (29) for said filtering elements (11, 13) and means of fixing/separating them to/from said machine, circulates between them. The invention also relates to a preimpregnated carbon fiber placement machine with at least one cleaning device (5).

12 Claims, 2 Drawing Sheets

CLEANING DEVICE FOR A PREIMPREGNATED CARBON FIBER PLACEMENT MACHINE

FIELD OF THE INVENTION

The present invention relates to a cleaning device for a preimpregnated carbon fiber tow placement machine, and particularly to a device for filtering, extracting and removing the excess surface fiber and resin in said fiber tows.

BACKGROUND OF THE INVENTION

Fiber placement machines such as the ones manufactured by Cincinnati Milacron Inc. are well known in the field of manufacture of composite material pieces. In these machines, a plurality of tows of fiber preimpregnated with resin which come from various reels are led in the form of a band of tows to an application head from which they are applied on a mould for shaping the pieces with the desired shapes.

Patents U.S. Pat. Nos. 5,022,952, 5,273,614 and EP 0 535264 A1 incorporated herein by reference, describe several features of the tow band guiding system.

Fiber placement machines are particularly used for placing layers of composite material on a contoured mould, the tows being very thin so as to be adapted to the desired contoured shapes.

The material of the tows is a preimpregnated material, a mixture of fibrous reinforcement and polymeric matrix of a sticky nature.

The tows, which can have a width of 3.2 mm for example, circulate through the fiber placement machine in the form of a band of a plurality of tows, for example 32 tows, to an application head in which the systems of cutting, clamping and advancing/restarting of the material are integrated such that the lay-up of the piece is carried out according to previously established patterns.

Until the band of tows reaches the application head, it passes through very narrow channels and guides for each tow for controlling its movements, causing a certain degree of fuzz-balls, dry fibers, dust, and excess surface resin and dirt to be generated due to the simple friction of the material in its passage through said guiding channels.

In turn, said defects can be originally present in the tows themselves because it is difficult to avoid them completely during their manufacture, especially in the case of very narrow tows requiring a high precision in the impregnation and cutting operations.

This excess of fibers and fluff causes jamming of the material in its passage through said guiding channels, causing a high rate of machine standstills in order to clean the machine, and therefore, a dramatic decrease of productivity thereof that can be estimated at around 30%, i.e. 30% of the total working time is required for maintenance.

In order to solve this drawback, refrigerating and dehumidifying both the working area and the application head of the fiber placement machine has been proposed but even though this reduces the drawback, it does not eliminate it because it is not possible to completely cool the working area.

The object of the present invention consists of providing a satisfactory solution to the aforementioned drawback.

SUMMARY OF THE INVENTION

In a first aspect, the present invention provides a cleaning device to be used in a preimpregnated carbon fiber placement machine including at least one guiding roller for guiding a band of tows to an application head. This device comprises two filtering elements arranged such that the band of tows runs between them. These elements are supported by two plates joined with adjustable clamping means for said filtering elements and means of fixing/separating them to/from said machine circulates between them.

In a second aspect, the present invention provides a fiber placement machine with at least one cleaning device with the features pointed out, preferably located at the exit of a guiding roller.

An important feature of the present invention is that the cleaning device must be used in such a way that the filtering of the band of tows is carried out before its entrance in the application head and that the excess fluff, dry fibers and resin are managed to be eliminated from the band to minimize maintenance requirements for the application head of the machine.

Another important feature of the present invention is that the device can have an element for removing the material (dry fibers and resins) accumulated in the filtering elements by means of vacuum, suction etc., so that the tows do not drag this material into the head.

Other features and advantages of the present invention will be understood from the following detailed description of an illustrative embodiment of its object with respect to the attached drawings.

DETAILED DESCRIPTION OF THE INVENTION

Figure 1A:
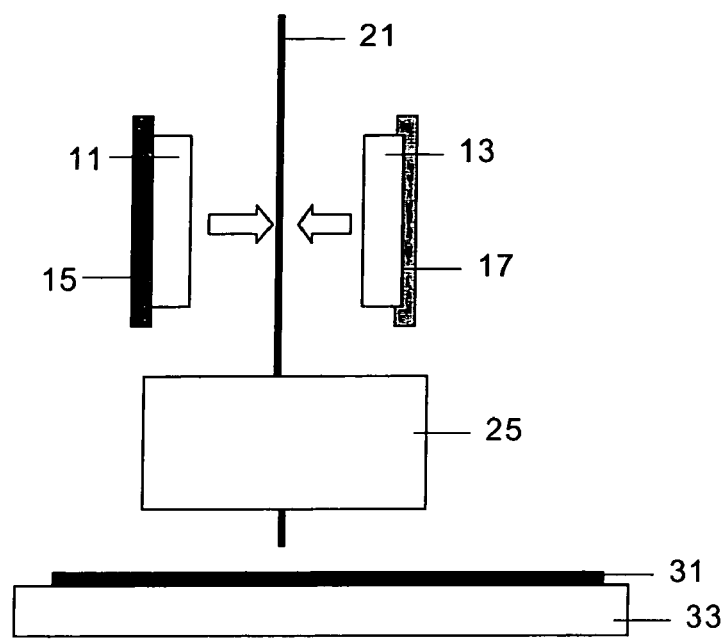
FIGS. 1a and 1b show schematic views of the cleaning device object of the present invention, before and after being applied to the band of tows, respectively.
Figure 1B:
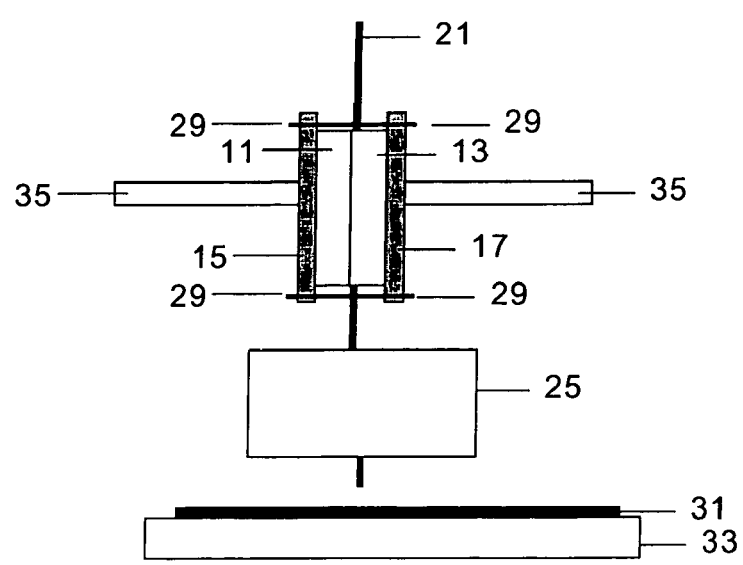
Figure 2:
FIG. 2 shows a schematic view of one of the filtering elements of the cleaning device with individual guiding channels for the tows of the band, for the purpose of preventing the tows from being joined, and therefore, sticking to each other.

It can be observed in FIGS. 1-3 that the cleaning device 5 object of the present invention comprises filtering elements 11, 13 supported by two plates 15, 17 joined with adjustable clamping means 29 for said filtering elements 11, 13 for their application to the band 21 of tows circulating through the fiber placement machine before reaching the application head 25 which places the required layers 31 of material on a mould 33.

Said plates 15, 17 also have means (not shown) of fixing them to the fiber placement machine.

The band 21 of tows passes between the filtering elements 11, 13 collecting the excess resin and fibers. The device 5 can include means of removing 35 said excess material, such as vacuum or suction systems, so that the possibility of a risk of said material subsequently adhering to the band 21 of tows is prevented.

In a preferred embodiment of the invention, one of the filtering elements 11, 13 has its inner side configured with guiding channels 41 for each tow 43 of the band 21 such that interferences between tows 43 are prevented.

The means of fixing the device and the means of joining the plates 15, 17 are designed such that the device 5 can be easily adjusted to the band 21 of tows and extracted from the fiber placement machine so as to be able to change the filtering elements 11, 13 with a certain frequency because the mentioned removal systems cannot prevent the presence of a certain level of adhered resin and fibers in the filtering elements 11, 13.

The most important requirements that the device 5 must comply with are the following:

Easy placement

Easy adjustment of the filtering elements 11, 13.

The filtering elements 11, 13 must be made with a material that does not contaminate the preimpregnated carbon fiber material forming the band 21 of tows. Furthermore, it must be assured that there is no transference of material from the filtering elements 11, 13 to the tows of preimpregnated material. In a preferred embodiment, they are made with honeycomb polyethylene foam.

The function of the filtering elements 11, 13 must be limited to extracting the excess surface fibers and resins, without affecting the material forming the core of the tows 43.

The ability to automatically adjust the degree of clamping of the filtering elements 11, 13 on the band 21 of tows.

Figure 3A:
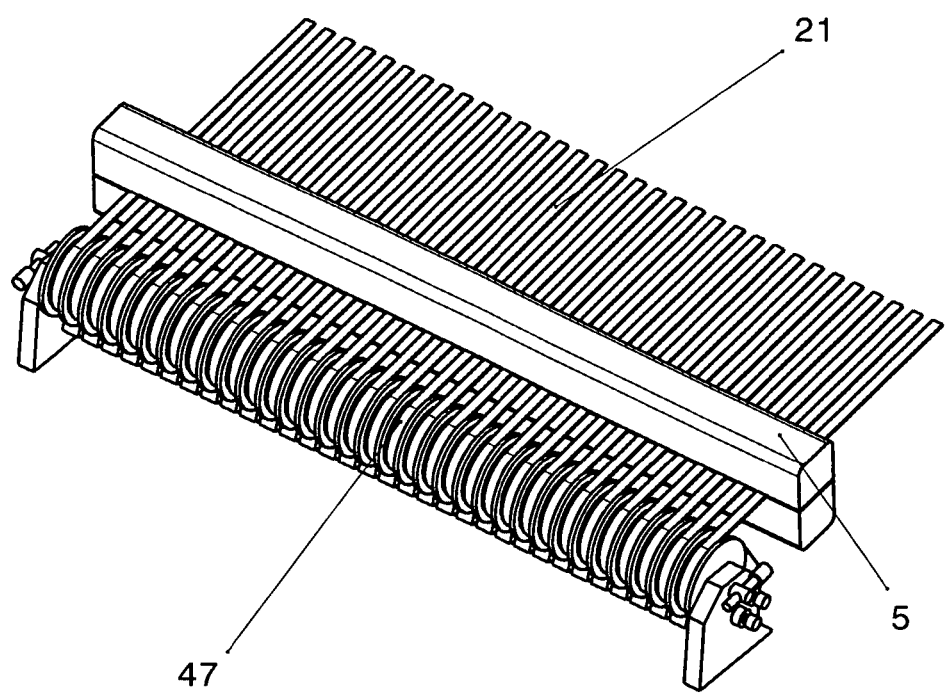
FIGS. 3a and 3b show views of the cleaning device object of the present invention located in a fiber placement machine at the exit of a guiding roller.
Figure 3B:
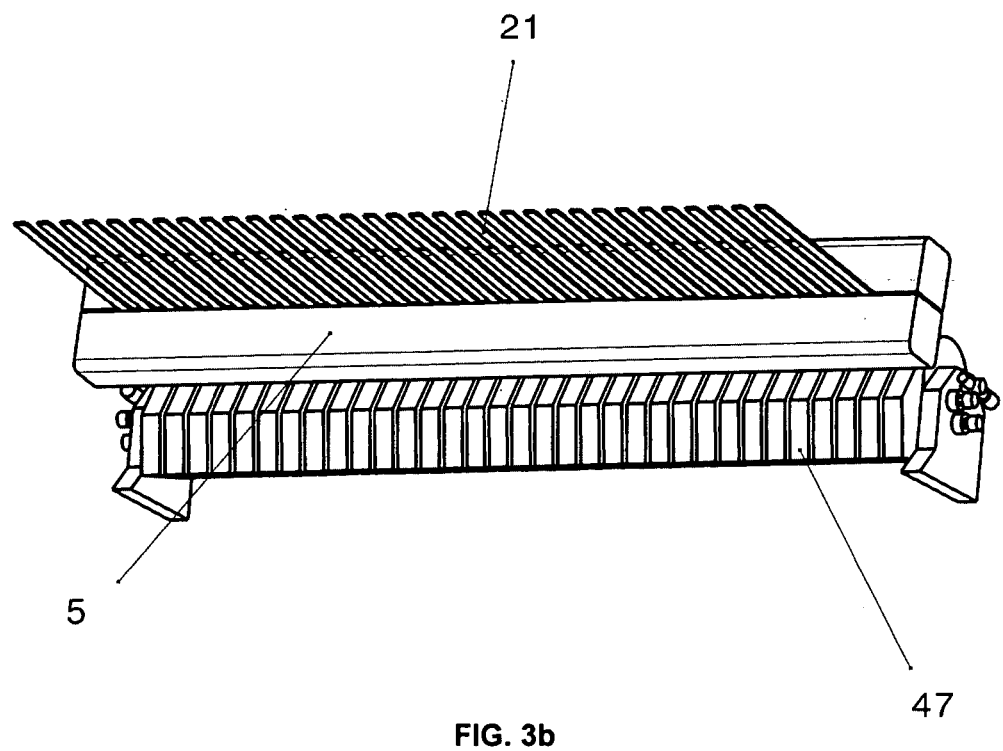

FIGS. 3a and 3b show a cleaning device 5 according to the present invention applied to the band 21 of tows at the exit of a guiding roller 47 of a fiber placement machine.

The present invention comprises the use of one or more cleaning devices 5 in a fiber placement machine in suitable locations, according to the specific configuration of each machine.

Those modifications comprised within the scope defined by the following claims can be introduced in the preferred embodiment which has just been described.

The invention claimed is:

1. A cleaning device (5) to be used in a preimpregnated carbon fiber placement machine including at least one guiding roller (47) for guiding a band (21) of tows to an application head (25), wherein said cleaning device comprises two filtering elements (11, 13) arranged such that a band (21) of tows passes between said filtering elements, said filtering elements being supported by two plates (15, 17) joined with adjustable clamps (29) for adjusting the position of said filtering elements (11, 13), wherein at least one of the filtering elements (11, 13) has its inner side configured with guiding channels (41) for the tows (43) of the band (21).

2. A cleaning device (5) to be used in a fiber placement machine according to claim 1, wherein the filtering elements (11, 13) are made with a material capable of extracting the excess surface fiber and resin from said tows (43) without reducing the fiber and resin content of their core.

3. A cleaning device (5) to be used in a fiber placement machine according to claim 2, wherein said filtering elements (11, 13) are made with honeycomb polyethylene foam.

4. A cleaning device (5) to be used in a fiber placement machine according to claim 1, wherein said cleaning device also comprises means of removing (35) the material from the tows (43) accumulated in said filtering elements (11, 13).

5. A preimpregnated carbon fiber placement machine including at least one guiding roller (47) for guiding a band (21) of tows to an application head (25), wherein said machine comprises at least one cleaning device (5) according to claim 1.

6. A preimpregnated carbon fiber placement machine according to claim 5, wherein said cleaning device (5) is located at the exit of a guiding roller (47).

7. A preimpregnated carbon fiber placement machine including at least one guiding roller (47) for guiding a band (21) of tows to an application head (25), wherein said machine comprises at least one cleaning device (5) according to claim 2.

8. A preimpregnated carbon fiber placement machine including at least one guiding roller (47) for guiding a band (21) of tows to an application head (25), wherein said machine comprises at least one cleaning device (5) according to claim 3.

9. A preimpregnated carbon fiber placement machine including at least one guiding roller (47) for guiding a band (21) of tows to an application head (25), wherein said machine comprises at least one cleaning device (5) according to claim 4.

10. A preimpregnated carbon fiber placement machine according to claim 7, wherein said cleaning device (5) is located at the exit of a guiding roller (47).

11. A preimpregnated carbon fiber placement machine according to claim 8, wherein said cleaning device (5) is located at the exit of a guiding roller (47).

12. A preimpregnated carbon fiber placement machine according to claim 9, wherein said cleaning device (5) is located at the exit of a guiding roller (47).

* * * * *